(12) United States Patent
Heath et al.

(10) Patent No.: US 11,421,769 B2
(45) Date of Patent: Aug. 23, 2022

(54) BI-DIRECTIONAL OVERRUNNING CLUTCH DIFFERENTIAL WITH OUTPUT HUB SUPPORTS

(71) Applicant: The Hilliard Corporation, Elmira, NY (US)

(72) Inventors: Kelly P. Heath, Corning, NY (US); Howard J. Knickerbocker, Cameron Mills, NY (US); Kevin Bennett, Elmira, NY (US)

(73) Assignee: The Hilliard Corporation, Elmira, NY (US)

( * ) Notice: Subject to any disclaimer, the term of this patent is extended or adjusted under 35 U.S.C. 154(b) by 0 days.

(21) Appl. No.: 17/324,689

(22) Filed: May 19, 2021

(65) Prior Publication Data

US 2021/0396302 A1    Dec. 23, 2021

Related U.S. Application Data

(60) Provisional application No. 63/042,746, filed on Jun. 23, 2020.

(51) Int. Cl.
| | |
|---|---|
| *F16H 48/16* | (2006.01) |
| *F16D 41/067* | (2006.01) |
| *F16D 41/08* | (2006.01) |
| *F16H 48/20* | (2012.01) |
| *F16H 48/42* | (2012.01) |
| *F16H 48/34* | (2012.01) |

(52) U.S. Cl.
CPC .......... *F16H 48/16* (2013.01); *F16D 41/067* (2013.01); *F16D 41/088* (2013.01); *F16H 48/34* (2013.01); *F16H 2048/204* (2013.01); *F16H 2048/423* (2013.01)

(58) Field of Classification Search
CPC ............... F16H 48/16; F16H 2048/204; F16H 2048/423; F16H 57/037
See application file for complete search history.

(56) References Cited

U.S. PATENT DOCUMENTS

| | | |
|---|---|---|
| 5,971,123 A | 10/1999 | Ochab et al. |
| 6,622,837 B2 | 9/2003 | Ochab et al. |
| (Continued) | | |

OTHER PUBLICATIONS

Extended European Search Report for Application No. 21177891.5, dated Oct. 25, 2021, 10 pages.

*Primary Examiner* — David R Morris
(74) *Attorney, Agent, or Firm* — Faegre Drinker Biddle & Reath LLP

(57) ABSTRACT

A bi-directional overrunning clutch differential is configured to transmit power from an input shaft to a first output shaft and a second output shaft in a vehicle. The differential includes a differential housing having a first bearing seat and a second bearing seat. A first bearing is carried by the differential housing in the first bearing seat, and a second bearing is carried by the differential housing in the second bearing seat. A first retaining ring secures the first bearing in the first bearing seat, and a second retaining ring secures the second bearing in the second bearing seat. A first output hub is carried by the first bearing for rotation relative to the differential housing, and a second output hub is carried by the second bearing for rotation relative to the differential housing.

20 Claims, 11 Drawing Sheets

(56) References Cited

U.S. PATENT DOCUMENTS

| | | | |
|---|---|---|---|
| 6,629,590 B2* | 10/2003 | Ochab | B60K 23/06 384/526 |
| 7,938,041 B1 | 5/2011 | Shiigi et al. | |
| 8,312,792 B1 | 11/2012 | Kochidomari et al. | |
| 8,840,514 B1 | 9/2014 | Knickerbocker et al. | |
| 8,857,294 B2 | 10/2014 | Brewer et al. | |
| 2002/0125097 A1* | 9/2002 | Ochab | F16D 41/067 192/38 |
| 2004/0060384 A1* | 4/2004 | Guo | F16H 57/021 74/607 |

* cited by examiner

BI-DIRECTIONAL OVERRUNNING CLUTCH DIFFERENTIAL WITH OUTPUT HUB SUPPORTS

CROSS-REFERENCE TO RELATED APPLICATION

The present application claims priority to and the benefit of U.S. Provisional Application No. 63/042,746, filed Jun. 23, 2020, the disclosure of which is incorporated herein by reference in its entirety.

FIELD OF THE INVENTION

The invention relates to bi-directional overrunning roller clutch differentials to transmit torque on-demand and, more particularly, to an improvement of the components tasked with supporting the output hub portions of the clutch.

BACKGROUND OF THE INVENTION

The output hubs in an all-terrain vehicle differential generally have output shafts that are connected to the hubs mounted in the differential through a spline connection. Referring to FIG. 1, a conventional bi-directional overrunning clutch differential 10 is illustrated. It is generally desired to allow the output shafts 12A, 12B (shown in phantom lines) to telescope in and out of or slide freely within the splined surfaces 14A, 14B of the hubs 16A, 16B, respectively. The output shafts 12A, 12B also contain a sliding joint such as a constant velocity joint (not shown) separate from the spline surfaces 14A, 14B to allow for sliding of the shafts 12A, 12B, respectively. However, the distance over which the output shafts 12A, 12B may telescope or slide has a limit due to, for example, size and/or other design constraints. In some driving situations, the output shafts 12A, 12B reach their telescoping limits, which results in the shafts 12A, 12B imparting heavy loads on the hubs 16A, 16B. Specifically, as the vehicle moves over different types of terrain, the heavy loads placed on the hubs 16A, 16B cause them to tip or skew about their axis of rotation and toward tipping axes 18A, 18B, respectively. This tipping can cause a torque limiting event in the bi-directional roller clutch 20 that is positioned around the hubs 16A, 16B. When this occurs the actual torque capacity of the roller clutch 20 is not realized and the clutch roll cage 22 can be damaged. More particularly, the tipping of the hubs 16A, 16B causes the rollers 24 that transmit torque between the clutch housing 26 and hub races 28A, 28B to not make proper contact with the profile and races 28A, 28B. That is, only small portions of the length of the rollers 24 make contact which produces higher contact stresses resulting in the rollers 24 slipping out of engagement. This slip is the torque limiting event. The resulting force of the rollers 24 slipping and coming out of engagement causes the rollers 24 to be violently propelled into the roll cage 22, which can cause permanent damage to the cage 22.

A need therefore exists for an improved bi-directional overrunning clutch differential that inhibits or prevents this overload condition.

SUMMARY OF THE INVENTION

In another aspect, the present invention provides a differential for transmitting power from an input shaft to a first output shaft and a second output shaft in a vehicle. The differential includes a differential housing having a bearing seat. An input gear is rotatably carried by the differential housing and configured to be rotatably driven by the input shaft. A ring gear is rotatably carried by the differential housing and configured to be rotatably driven by the input gear. A first bearing is carried by the differential housing in the bearing seat, and a second bearing is carried by the differential housing. A retaining ring is carried by the differential housing, and the retaining ring compresses the first bearing against the differential housing and secures the first bearing in the bearing seat. The differential further includes a bi-directional overrunning clutch, which includes a clutch housing formed on or coupled to the ring gear and being rotatable in combination with the ring gear. The clutch housing includes an inner surface. The bi-directional overrunning clutch further includes a roll cage assembly disposed inwardly of the inner surface of the clutch housing. The roll cage assembly includes a roll cage and a plurality of rollers carried by the roll cage. The differential further includes two output hubs, including a first output hub and a second output hub. The first output hub is disposed within the clutch housing and carried by the first bearing for rotation relative to the differential housing. The first output hub is configured to rotatably drive the first output shaft. The second output hub is disposed within the clutch housing and carried by the second bearing for rotation relative to the differential housing. The second output hub is configured to rotatably drive the second output shaft. The bi-directional overrunning clutch is engageable to cause the plurality of rollers to wedge between the inner surface of the clutch housing and the output hubs, and the output hubs and the clutch housing are thereby rotatable in combination. The differential further includes an electromagnet assembly configured to be energized to cause engagement of the bi-directional overrunning clutch.

In some embodiments the retaining ring is located between a surface of the differential housing and a surface of the bearing, and at least one of (i) the surface of the differential housing, (ii) the surface of the bearing, or (iii) a surface of the retaining ring includes a taper. Preferably, the surface of the differential housing is a tapered groove, and the retaining ring is a tapered retaining ring carried in the tapered groove.

In some embodiments, the differential housing further includes a tapered groove, and the retaining ring is a tapered retaining ring carried in the tapered groove.

In some embodiments, the retaining ring is a snap ring.

In some embodiments, the bearing seat is a first bearing seat and the retaining ring is a first retaining ring, the differential housing further includes a second bearing seat, and the differential further includes a second retaining ring carried by the differential housing, and the second retaining ring compressing the second bearing against the differential housing and securing the second bearing in the second bearing seat.

In some embodiments, the retaining ring is disposed axially inward of the first bearing and the bearing seat is disposed axially outward of the first bearing.

In some embodiments, the retaining ring is disposed axially outward of the first bearing and the bearing seat is disposed axially inward of the first bearing.

In some embodiments, the first bearing is a roller bearing.

In some embodiments, the roller bearing includes an outer race and an inner race, the outer race is disposed between the retaining ring and the bearing seat, and the inner race carries the first output hub.

In some embodiments, the differential further includes a bushing disposed within and coupling the first output hub and the second output hub.

In some embodiments, the bushing is a one-piece bushing.

In some embodiments, the bushing is a two-piece bushing.

In some embodiments, the differential further includes a roller bearing assembly coupling the first output hub and the second output hub, the roller bearing assembly having a roller bearing and a hub bearing adapter. The roller bearing includes an outer race and an inner race, the outer race being positioned against an inner diameter of the first output hub. The hub bearing adapter is formed on or coupled to the second output hub and positioned against the inner race of the roller bearing.

In another aspect, the present invention provides a differential for transmitting power from an input shaft to a first output shaft and a second output shaft in a vehicle. The differential includes a differential housing having a first bearing seat and a second bearing seat. An input gear is rotatably carried by the differential housing and configured to be rotatably driven by the input shaft. A ring gear is rotatably carried by the differential housing and configured to be rotatably driven by the input gear. A first bearing is carried by the differential housing in the first bearing seat, and a second bearing is carried by the differential housing in the second bearing seat. A first retaining ring is carried by the differential housing, and the first retaining ring compresses the first bearing against the differential housing and secures the first bearing in the first bearing seat. A second retaining ring is carried by the differential housing, and the second retaining ring compresses the second bearing against the differential housing and secures the second bearing in the second bearing seat. Two output hubs are configured to be selectively rotatably driven by the ring gear. A first output hub is carried by the first bearing for rotation relative to the differential housing, and the first output hub is configured to rotatably drive the first output shaft. A second output hub is carried by the second bearing for rotation relative to the differential housing, and the second output hub is configured to rotatably drive the second output shaft.

In some embodiments the first retaining ring is located between a surface of the differential housing and a surface of the first bearing, and at least one of (i) the surface of the differential housing, (ii) the surface of the first bearing, or (iii) a surface of the first retaining ring includes a taper.

In some embodiments, the differential housing further includes a first tapered groove and a second tapered groove, the first retaining ring is a first tapered retaining ring carried in the first tapered groove, and the second retaining ring is a second tapered retaining ring carried in the second tapered groove.

In some embodiments, the first retaining ring is a first snap ring and the second retaining ring is a second snap ring.

In some embodiments, the first retaining ring is disposed axially inward of the first bearing and the first bearing seat is disposed axially outward of the first bearing, and the second retaining ring is disposed axially inward of the second bearing and the second bearing seat is disposed axially outward of the second bearing.

In some embodiments, the first retaining ring is disposed axially outward of the first bearing and the first bearing seat is disposed axially inward of the first bearing, and the second retaining ring is disposed axially outward of the second bearing and the second bearing seat is disposed axially inward of the second bearing.

In some embodiments, the first bearing is a first roller bearing and the second bearing is a second roller bearing.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DESCRIPTION OF THE DRAWINGS

Figure 1:
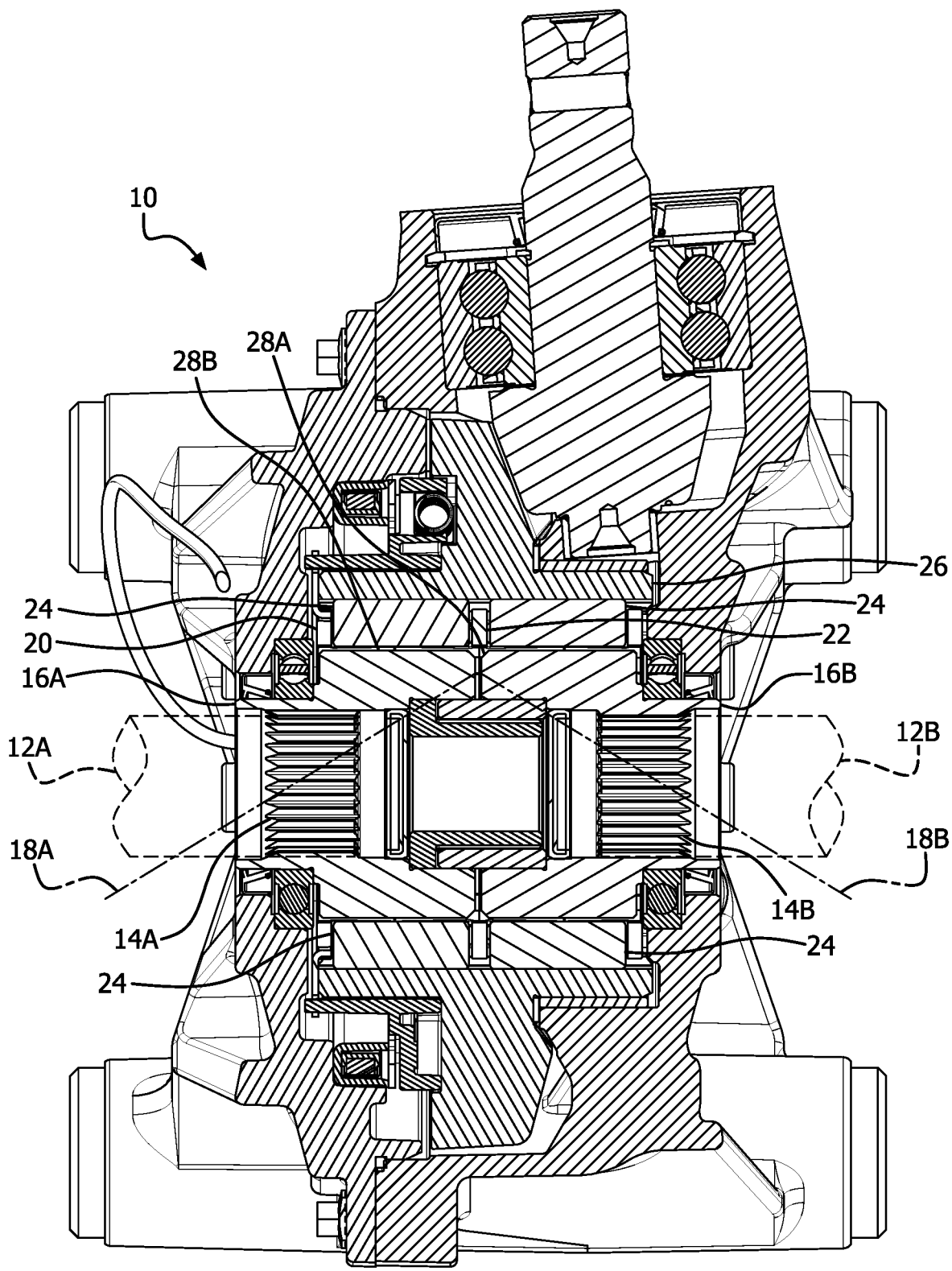
FIG. 1 is a side sectional view of a bi-directional overrunning clutch differential according to the prior art.
Figure 2:
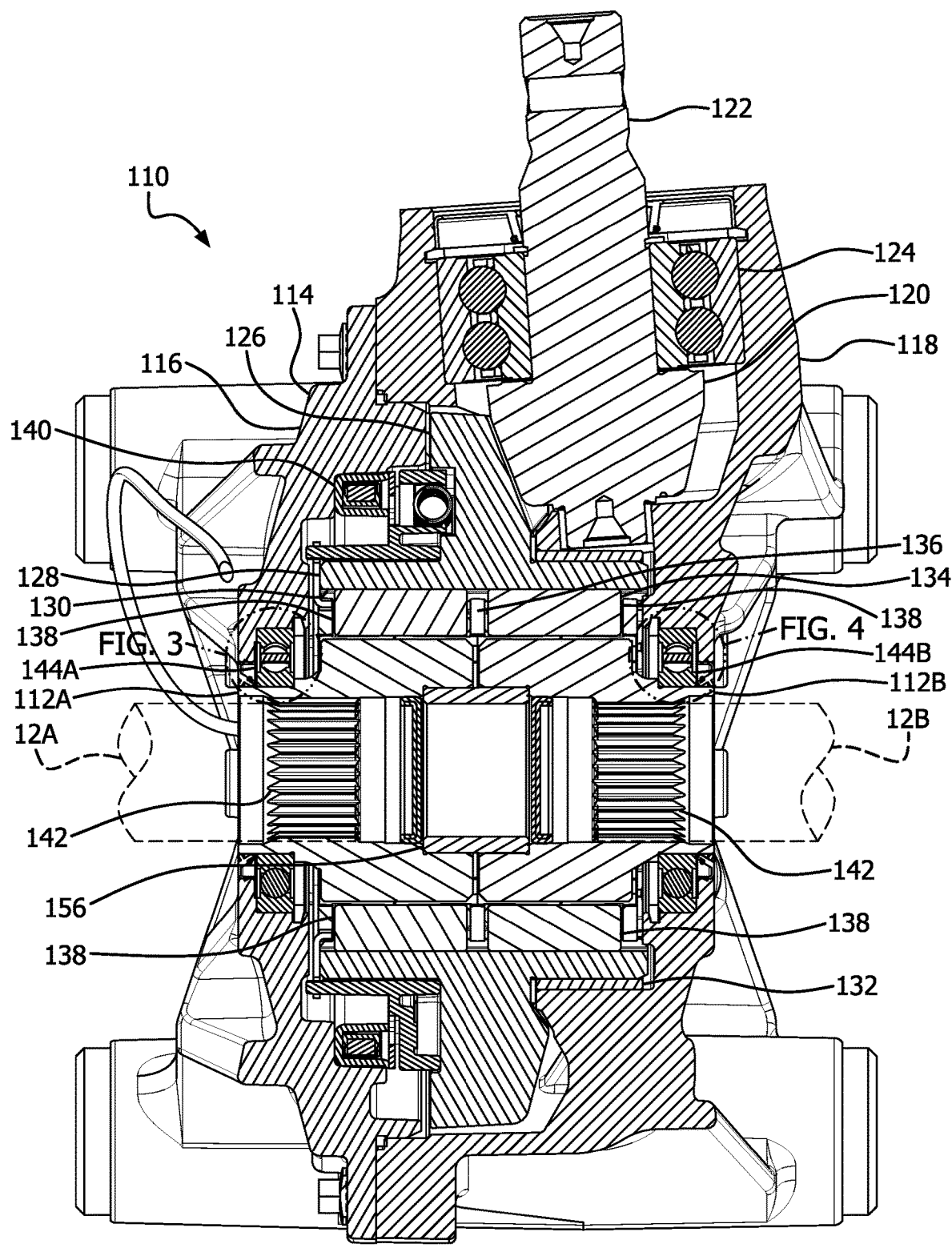
FIG. 2 is a side sectional view of a bi-directional overrunning clutch according to a first embodiment of the present invention.

Referring to the drawings, wherein like reference numerals illustrate corresponding or similar elements throughout the several views, FIG. 2 illustrates a bi-directional overrunning clutch differential 110 according to an embodiment of the present invention. The differential 110 may have similar components and features to any of the differentials described in U.S. Pat. No. 5,971,123 titled "Bi-directional Overrunning Clutch"; U.S. Pat. No. 6,622,837 titled "Bi-directional Overrunning Clutch with Automatic Backdrive"; U.S. Pat. No. 8,840,514 titled "Bi-directional Overrunning Clutch with Improved Indexing Mechanism"; and U.S. Pat. No. 8,857,294 titled "Engagement Control Assembly for a Bi-directional Overrunning Clutch", the disclosures of which are each incorporated herein by reference in their entireties. In addition, the differential 110 includes features for supporting the output hubs 112A, 112B to inhibit or prevent the torque limiting event from occurring. These aspects are described in further detail below.

With continued reference to FIG. 2, the differential 110 includes a differential housing 114 including a cover 116 removably mounted to a differential gear case 118. As illustrated, a pinion input gear 120 is rotatably disposed within the case 118, and the pinion input gear 120 couples to a shaft 122 that is adapted to couple to an input or drive shaft (not shown). In order to facilitate rotation of the pinion input shaft 122, a bearing 124 is preferably mounted between the shaft 122 and the case 118. The pinion input gear 120 engages with a ring gear 126 disposed within the differential case 118. The pinion input gear 120 and the ring gear 126 are illustratively provided as bevel gears, although it is contemplated that other gearing arrangements may be used, such as a worm gear set or helical gear set.

The ring gear 126 is constructed monolithically with or attached to a clutch housing 128. The clutch housing 128 includes an inner surface with a contour or cam surface 130. A bushing 132 is mounted between the clutch housing 128 and the differential case 118 for permitting the clutch housing 128 to freely rotate within the differential case 118. A roll cage assembly 134 is located within the clutch housing 128 and includes a roll cage 136 with a plurality of rollers 138 rotatably disposed within slots (not shown) in the cage 136. More specifically, the roll cage 136 preferably includes two independent sets of rollers 138 disposed within two sets of slots formed in the roll cage 136 around its circumference. Each set of rollers 138 is located adjacent to the inner cam surface 130 of the clutch housing 128. In one configuration, of the contour of the cam surface 130 includes a plurality of peaks and valleys (not shown). When the roll cage 136 is located within the clutch housing 128 and the clutch is not activated, the rollers 138 are located within the valleys with the cam surface 130 tapering toward the cage 136 on either side of the roller 104. The cam surface 130 and rollers 138 provide the differential 110 capabilities as described in detail in U.S. Pat. Nos. 6,629,590, 6,622,837 and 6,722,484, the disclosures of which are each incorporated herein by reference in their entireties. Cam surfaces and roll cages in overrunning clutches are well known in the art. Hence, a detailed discussion of these features is not needed.

With continued reference to FIG. 2, the output hubs 112A, 112B include a portion located radially inward of the roll cage 136. Each hub 112A, 112B is adjacent to one of the sets of rollers 138 such that the outer surface of a portion of each hub contacts a set of rollers 138. As is well understood in the art, the overrunning clutch is engaged or activated to cause contact between the rollers 138, the clutch housing 128, and the hubs 112A, 112B to transfer rotation between the clutch housing 128 and the hubs 112A, 112B.

The differential 110 further includes an electromagnet assembly 140 that is energized to engage the overrunning clutch. The electromagnet assembly 140 may include, for example, one or more roll cage adjustment devices or indexing devices, and such devices are electrically connected to an electronic control system (not shown). Each indexing device preferably includes an electromagnetic coil assembly. A first indexing device (for example, an electronic or electromagnetic drive activation device or electromagnetic drive coil assembly) may be configured, when activated, to cause the roll cage 136 to index into an active drive state (that is, four-wheel drive capability). A second indexing device (for example, an electromagnetic backdrive activation device or electromagnetic backdrive coil assembly) is configured, when activated, to cause the roll cage 136 to index into an active backdrive state (that is, engine breaking capability). Other components and features of suitable electromagnet assemblies for use in the present invention are well known to those skilled in the art. Hence, further discussion of such assemblies is not needed.

The hubs 112A, 112B engage with output shafts 12A, 12B, respectively, via any conventional means designed to transfer torque from the hubs 112A, 112B to the shafts 12A, 12B, respectively. In the illustrated embodiment, each hub 112A, 112B includes internal splines 142 which mate with external splines (not shown) on a portion of the output shafts 12A, 12B. The internal splines 142 on the hubs 112A, 112B are accessible through openings formed in the cover 116 and gear case 118. Roller bearings 144A, 144B are mounted between portions of the hubs 112A, 112B, respectively, and the corresponding cover 116 or case 118. The roller bearings 144A, 144B support the hubs 112A, 112B while permitting the hubs 112A, 112B to rotate with respect to the cover 116 and case 118, respectively.

Figure 3:
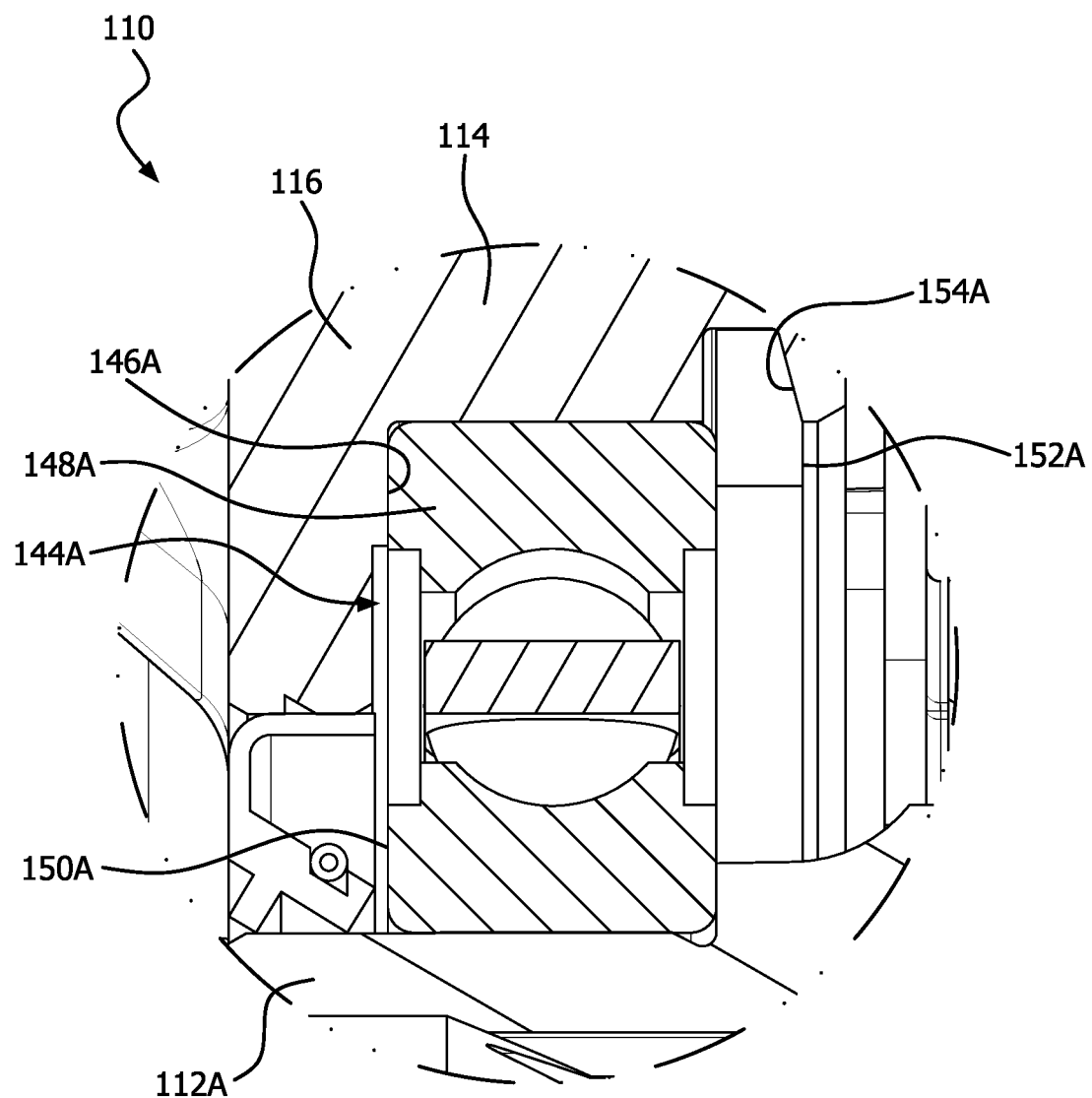
FIG. 3 is a detail side sectional view of the bi-directional overrunning clutch within the detail line identified as "FIG. 3" in FIG. 2.
Figure 4:
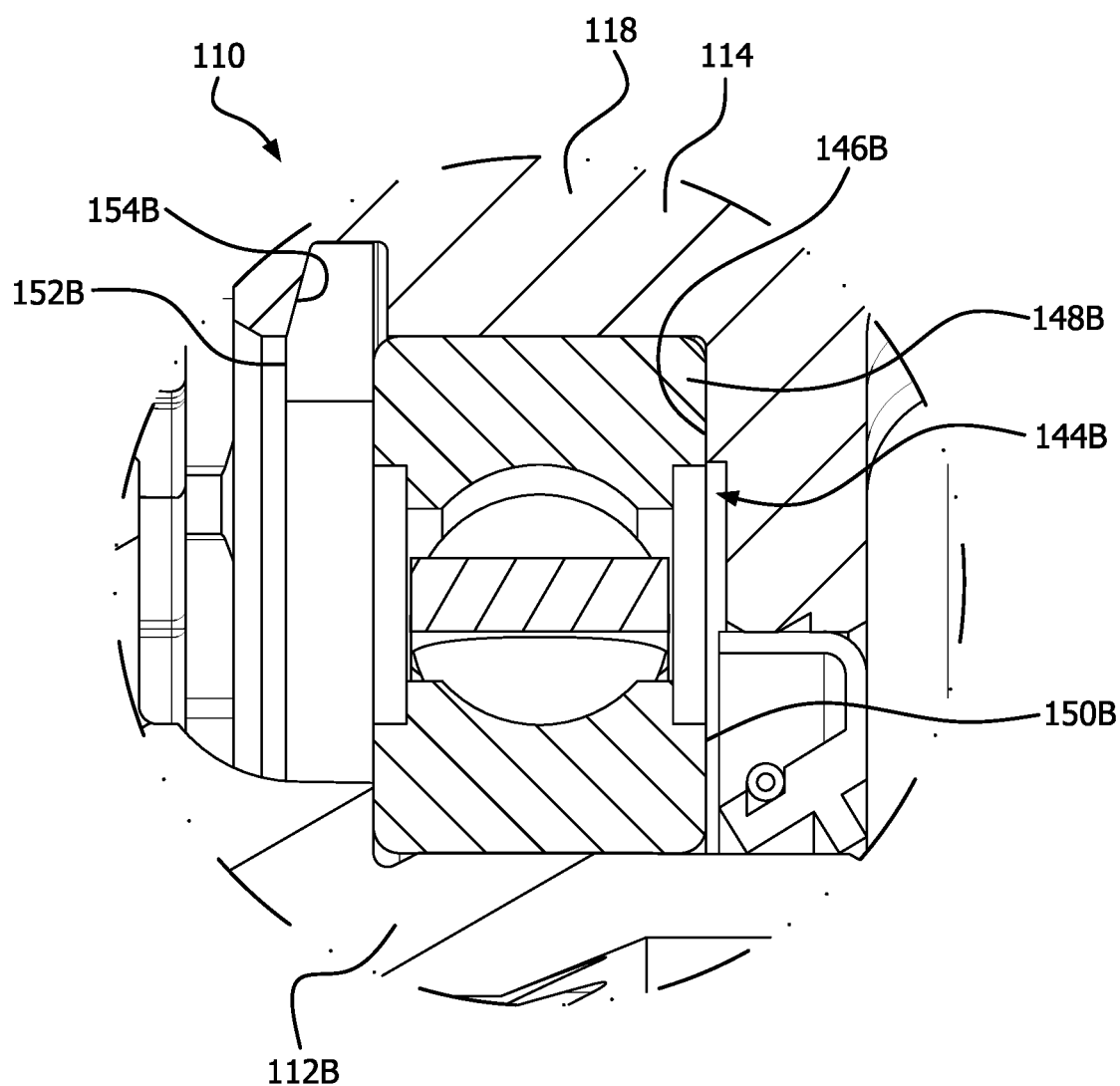
FIG. 4 is a detail side sectional view of the bi-directional overrunning clutch within the detail line identified as "FIG. 4" in FIG. 2.

As described briefly above, the differential 110 also includes features for supporting the output hubs 112A, 112B to inhibit or prevent the torque limiting event from occurring. Referring to the detail view of FIG. 3, the cover 116 includes a roller bearing seat 146A, or a recess formed by an annular projection, within which the outer race 148A of the roller bearing 144A is seated, and the inner race 150A of the roller bearing 144A is positioned against and supports the hub 112A. The roller bearing seat 146A may continuously extend around the rotation axis of the hub 112A, or the roller bearing seat 146A may be interrupted. A retaining ring 152A, more specifically a snap ring, secures the roller bearing 144A within the seat 146A in the cover 116. The retaining ring 152A is positioned against the outer race 148A of the roller bearing 144A. Illustratively, the retaining ring 152A is tapered and received by a tapered ring groove 154A to positively lock the ring 152A against the bearing 144A and reduce or eliminate axial end play of the bearing 144A. Stated differently, the retaining ring 152A compresses the bearing 144A against the cover 116 to secure the bearing 144A in the seat 146A. Similarly and referring to the detail view of FIG. 4, the gear case 118 includes a roller bearing seat 146B, or a recess formed by an annular projection, within which the outer race 148B of the roller bearing 144B is seated, and the inner race 150B of the roller bearing 144B is positioned against and supports the hub 112B. The roller bearing seat 146B may continuously extend around the rotation axis of the hub 112B, or the roller bearing seat 146B may be interrupted. A retaining ring 152B, more specifically a snap ring, secures the roller bearing 144B within the seat 146B in the gear case 118. The retaining ring 152B is positioned against the outer race 148B of the roller bearing 144B. Illustratively, the retaining ring 152B is tapered and received by a tapered ring groove 154B to positively lock the ring 152B against the bearing 144B and reduce or eliminate axial end play of the bearing 144B. Stated differently, the retaining ring 152B compresses the bearing 144B against the gear case 118 to secure the bearing 144B in the seat 146B. Thus, and referring collectively to FIGS. 2-4, the roller bearings 144A, 144B are secured to the cover 116 and the gear case 118, respectively, and the roller bearings 144A, 144B are inhibited from moving axially relative to the housing 114.

Additionally, a one-piece bushing 156 (FIG. 2) is located within and couples the output hubs 112A, 112B. In the illustrated embodiment, the seats 146A, 146B are disposed axially outward of the roller bearings 144A, 144B, respectively, and the retaining rings 152A, 152B are disposed axially inward of the roller bearings 144A, 144B, respectively. Thus, for installation, the roller bearings 144A, 144B are inserted from the inside of the cover 116 and the gear case 118, respectively, and then the retaining rings 152A, 152B are inserted from the inside of the cover 116 and the gear case 118, respectively.

Figure 5:
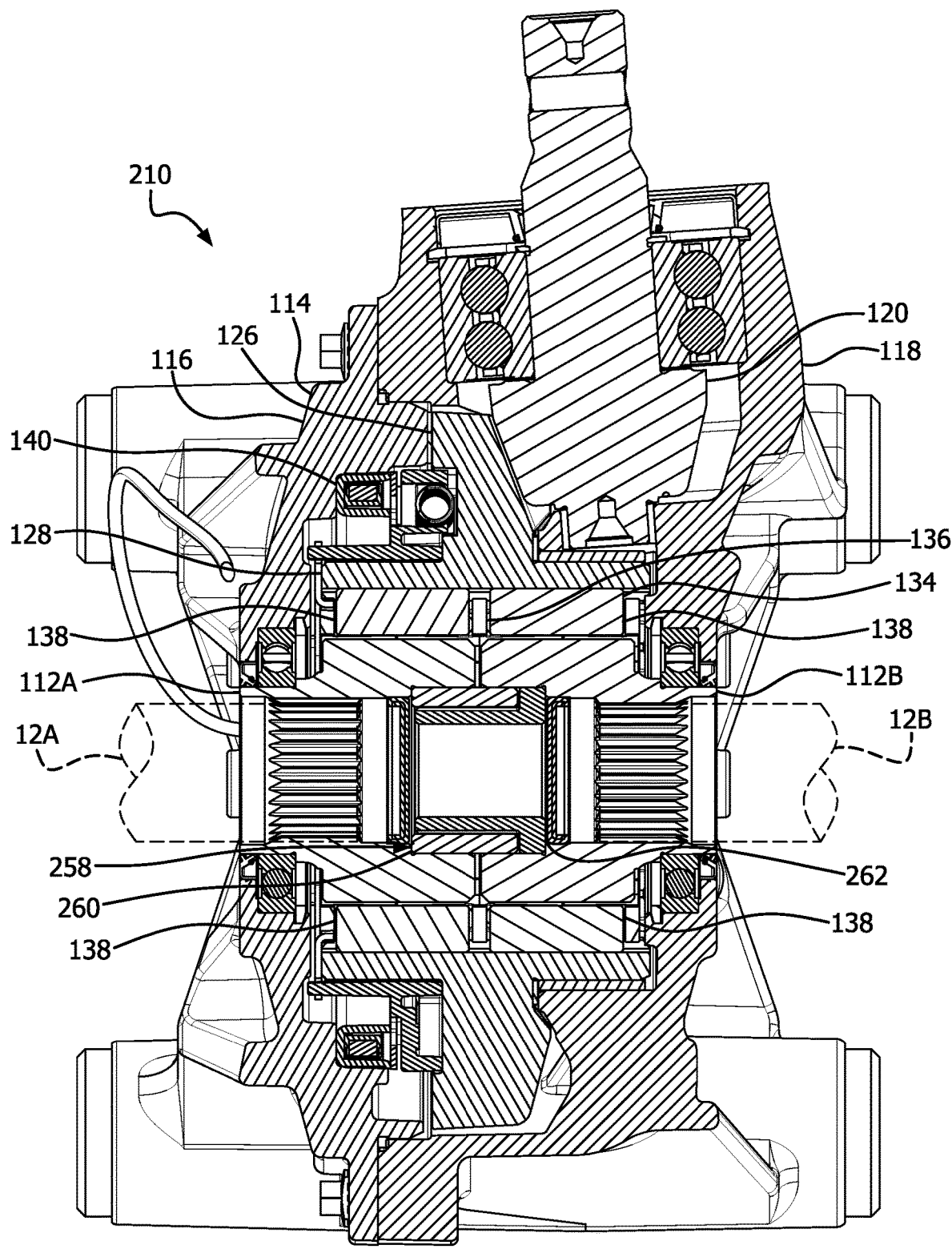
FIG. 5 is a side sectional view of a bi-directional overrunning clutch according to a second embodiment of the present invention.

FIG. 5 illustrates a bi-directional overrunning clutch differential 210 according to another embodiment of the present invention. The differential 210 includes many of the same components as the differential 110 described above, and the same components are identified with the same reference numbers. The differential 210 generally includes a housing 114, specifically a cover 116 and a gear case 118, that rotatably carries a pinion input gear 120 and a ring gear 126. The ring gear 126 is formed integral with or attached to a clutch housing 128. A roll cage assembly 134 is located within the clutch housing 128 and includes a roll cage 136 with a plurality of rotatable rollers 138. Output hubs 112A, 112B include a portion located radially inward of the roll cage 136. Each hub 112A, 112B is adjacent to one of the sets of rollers 138 such that the outer surface of a portion of each hub contacts a set of rollers 138. The overrunning clutch is engaged or activated, for example, by energizing an electromagnet assembly 140, to cause contact between the rollers 138, the clutch housing 128, and the hubs 112A, 112B. The overrunning clutch thereby transfers rotation between the clutch housing 128, the hubs 112A, 112B, and output shafts 12A, 12B.

The differential 210 also includes features for supporting the output hubs 112A, 112B to inhibit or prevent the torque limiting event from occurring. More specifically and with reference to the detail view of the differential 110 in FIG. 3, which illustrates the same features as the differential 210, the cover 116 includes a roller bearing seat 146A, or a recess formed by an annular projection, within which the outer race 148A of the roller bearing 144A is seated, and the inner race 150A of the roller bearing 144A is positioned against and supports the hub 112A. A retaining ring 152A, more specifically a snap ring, secures the roller bearing 144A within the seat 146A in the cover 116. The retaining ring 152A is positioned against the outer race 148A of the roller bearing 144A. Illustratively, the retaining ring 152A is tapered and received by a tapered ring groove 154A to positively lock the ring 152A against the bearing 144A and reduce or eliminate axial end play of the bearing 144A. Stated differently, the retaining ring 152A compresses the bearing 144A against the cover 116 to secure the bearing 144A in the seat 146A. Similarly and with reference to the detail view of the differential 110 in FIG. 4, which illustrates the same features as the differential 210, the gear case 118 includes a roller bearing seat 146B, or a recess formed by an annular projection, within which the outer race 148B of the roller bearing 144B is seated, and the inner race 150B of the roller bearing 144B is positioned against and supports the hub 112B. A retaining ring 152B, more specifically a snap ring, secures the roller bearing 144B within the seat 146B in the gear case 118. The retaining ring 152B is positioned against the outer race 148B of the roller bearing 144B. Illustratively, the retaining ring 152B is tapered and received by a tapered ring groove 154B to positively lock the ring 152B against the bearing 144B and reduce or eliminate axial end play of the bearing 144B. Stated differently, the retaining ring 152B compresses the bearing 144B against the gear case 118 to secure the bearing 144B in the seat 146B. Thus and referring again to FIG. 5, the roller bearings 144A, 144B are secured to the cover 116 and the gear case 118, respectively, and the roller bearings 144A, 144B are inhibited from moving axially relative to the housing 114.

Additionally, a two-piece bushing 258 is located within and couples the output hubs 112A, 112B. The two-piece bushing 258 illustratively includes a cylindrical outer bushing 260 and an open top hat-shaped inner bushing 262. The outer bushing 260 is seated on a cylindrical extension of the inner bushing 262 as shown. The outer bushing 260 is press fittingly-received by the output hub 112A, the inner bushing 262 is press fittingly-received by the output hub 112B, and the outer bushing 260 and the inner bushing 262 are rotatable relative to each other. In some embodiments, the two-piece bushing 258 provides a greater length-to-diameter (L/D) ratio than other structures, such as structures including single-piece bushings. Advantageously, a greater L/D ratio facilitates maintaining concentricity of the output hubs 112A, 112B.

In the illustrated embodiment, the seats 146A, 146B are disposed axially outward of the roller bearings 144A, 144B, respectively, and the retaining rings 152A, 152B are disposed axially inward of the roller bearings 144A, 144B, respectively. Thus, for installation, the roller bearings 144A, 144B are inserted from the inside of the cover 116 and the gear case 118, respectively, and then the retaining rings 152A, 152B are inserted from the inside of the cover 116 and the gear case 118, respectively.

Figure 6:
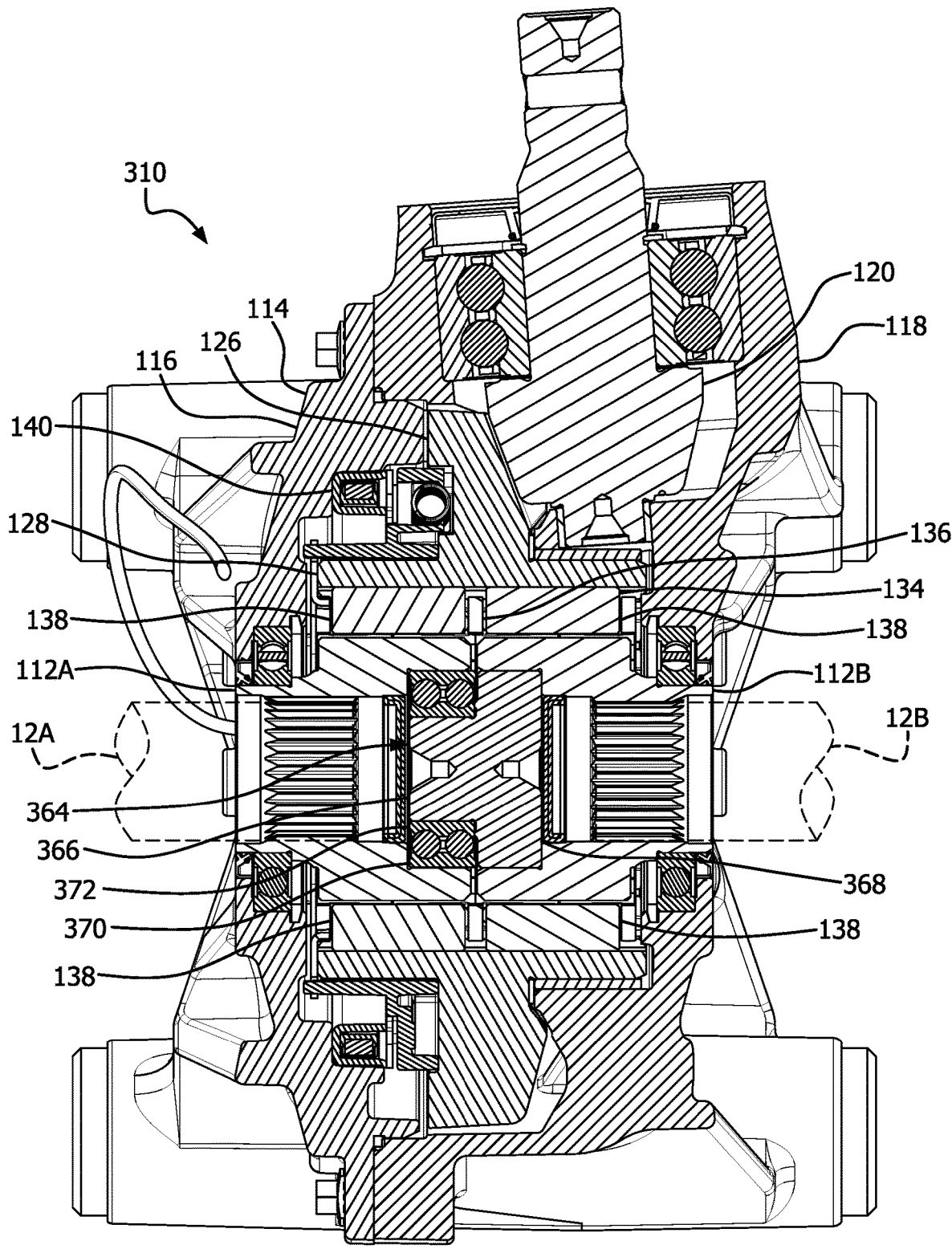
FIG. 6 is a side sectional view of a bi-directional overrunning clutch according to a third embodiment of the present invention.

FIG. 6 illustrates a bi-directional overrunning clutch differential 310 according to another embodiment of the present invention. The differential 310 includes many of the same components as the differential 110 described above, and the same components are identified with the same reference numbers. The differential 310 generally includes a housing 114, specifically a cover 116 and a gear case 118, that rotatably carries a pinion input gear 120 and a ring gear 126. The ring gear 126 is formed integral with or attached to a clutch housing 128. A roll cage assembly 134 is located within the clutch housing 128 and includes a roll cage 136 with a plurality of rotatable rollers 138. Output hubs 112A, 112B include a portion located radially inward of the roll cage 136. Each hub 112A, 112B is adjacent to one of the sets of rollers 138 such that the outer surface of a portion of each hub contacts a set of rollers 138. The overrunning clutch is engaged or activated, for example, by energizing an electromagnet assembly 140, to cause contact between the rollers 138, the clutch housing 128, and the hubs 112A, 112B. The overrunning clutch thereby transfers rotation between the clutch housing 128, the hubs 112A, 112B, and output shafts 12A, 12B.

The differential 310 also includes features for supporting the output hubs 112A, 112B to inhibit or prevent the torque limiting event from occurring. More specifically and with reference to the detail view of the differential 110 in FIG. 3, which illustrates the same features as the differential 310, the cover 116 includes a roller bearing seat 146A, or a recess formed by an annular projection, within which the outer race 148A of the roller bearing 144A is seated, and the inner race 150A of the roller bearing 144A is positioned against and supports the hub 112A. A retaining ring 152A, more specifically a snap ring, secures the roller bearing 144A within the seat 146A in the cover 116. The retaining ring 152A is positioned against the outer race 148A of the roller bearing 144A. Illustratively, the retaining ring 152A is tapered and received by a tapered ring groove 154A to positively lock the ring 152A against the bearing 144A and reduce or eliminate axial end play of the bearing 144A. Stated differently, the retaining ring 152A compresses the bearing 144A against the cover 116 to secure the bearing 144A in the seat 146A. Similarly and with reference to the detail view of the differential 110 in FIG. 4, which illustrates the same features as the differential 310, the gear case 118 includes a roller bearing seat 146B, or a recess formed by an annular projection, within which the outer race 148B of the roller bearing 144B is seated, and the inner race 150B of the roller bearing 144B is positioned against and supports the hub 112B. A retaining ring 152B, more specifically a snap ring, secures the roller bearing 144B within the seat 146B in the gear case 118. The retaining ring 152B is positioned against the outer race 148B of the roller bearing 144B. Illustratively, the retaining ring 152B is tapered and received by a tapered ring groove 154B to positively lock the ring 152B against the bearing 144B and reduce or eliminate axial end play of the bearing 144B. Stated differently, the retaining ring 152B compresses the bearing 144B against the gear case 118 to secure the bearing 144B in the seat 146B. Thus and referring again to FIG. 6, the roller bearings 144A, 144B are secured to the cover 116 and the gear case 118, respectively, and the roller bearings 144A, 144B are inhibited from moving axially relative to the housing 114.

Additionally, a roller bearing assembly 364 is located within and couples the output hubs 112A, 112B. The roller bearing assembly 364 includes a roller bearing 366 and a top hat-shaped hub bearing adapter 368. An outer race 370 of the roller bearing 366 is positioned against the inner diameter of one of the hubs (illustratively, the output hub 112A), and the adapter 368 is positioned against the inner race 372 of the roller bearing 366 and the inner diameter of the other hub (illustratively, the output hub 112B). The adapter 368 may be a separate component, as illustrated, or monolithically constructed with one of the hubs 112A or 112B.

In the illustrated embodiment, the seats 146A, 146B are disposed axially outward of the roller bearings 144A, 144B, respectively, and the retaining rings 152A, 152B are disposed axially inward of the roller bearings 144A, 144B, respectively. Thus, for installation, the roller bearings 144A, 144B are inserted from the inside of the cover 116 and the gear case 118, respectively, and then the retaining rings 152A, 152B are inserted from the inside of the cover 116 and the gear case 118, respectively.

Figure 7:
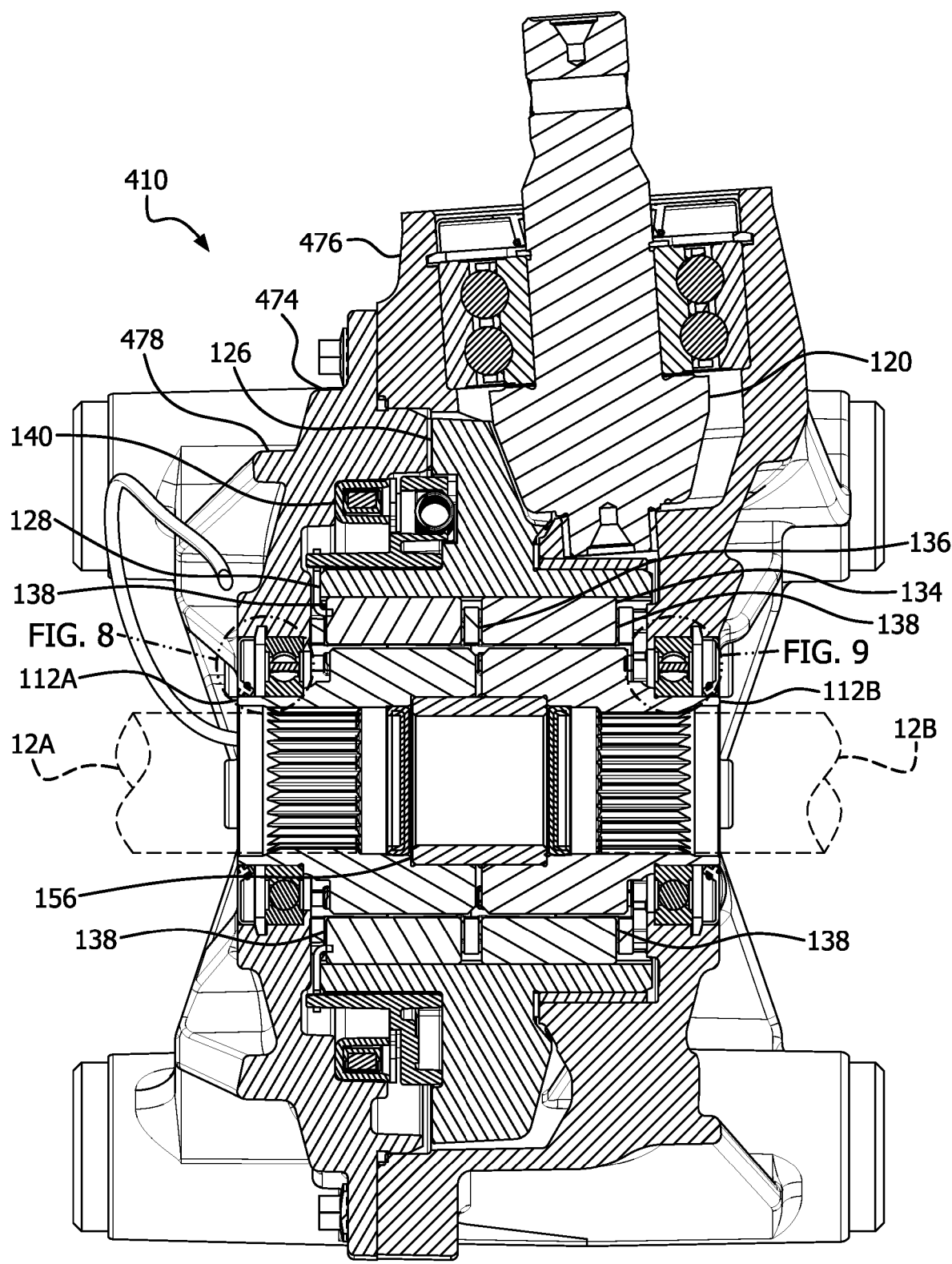
FIG. 7 is a side sectional view of a bi-directional overrunning clutch according to a fourth embodiment of the present invention.

FIG. 7 illustrates a bi-directional overrunning clutch differential 410 according to another embodiment of the present invention. The differential 410 includes many of the same components as the differential 110 described above, and the same components are identified with the same reference numbers. The differential 410 generally includes a housing 474, specifically a gear case 476 and a cover 478, that rotatably carries a pinion input gear 120 and a ring gear 126. The ring gear 126 is formed integral with or attached to a clutch housing 128. A roll cage assembly 134 is located within the clutch housing 128 and includes a roll cage 136 with a plurality of rotatable rollers 138. Output hubs 112A, 112B include a portion located radially inward of the roll cage 136. Each hub 112A, 112B is adjacent to one of the sets of rollers 138 such that the outer surface of a portion of each hub contacts a set of rollers 138. The overrunning clutch is engaged or activated, for example, by energizing an electromagnet assembly 140, to cause contact between the rollers 138, the clutch housing 128, and the hubs 112A, 112B. The overrunning clutch thereby transfers rotation between the clutch housing 128, the hubs 112A, 112B, and output shafts 12A, 12B.

Figure 8:
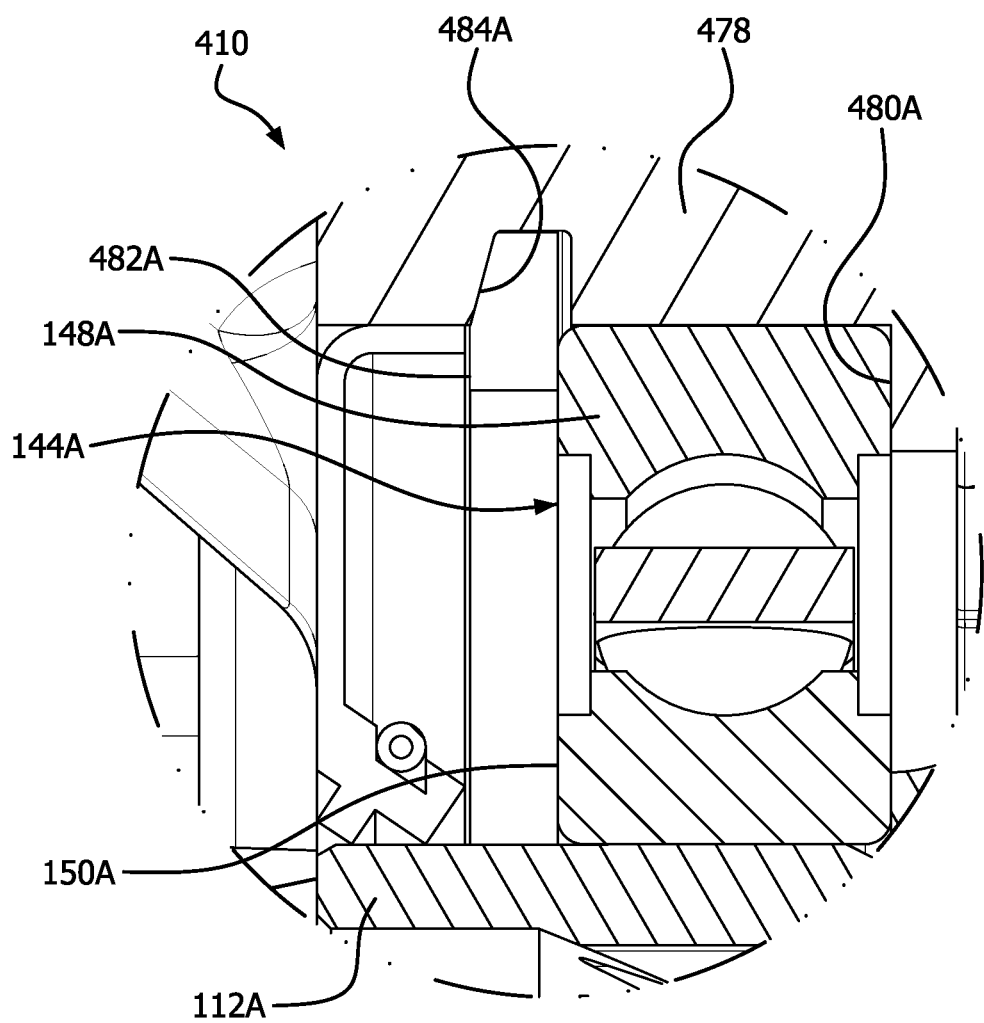
FIG. 8 is a detail side sectional view of the bi-directional overrunning clutch within the detail line identified as "FIG. 8" of FIG. 7.
Figure 9:
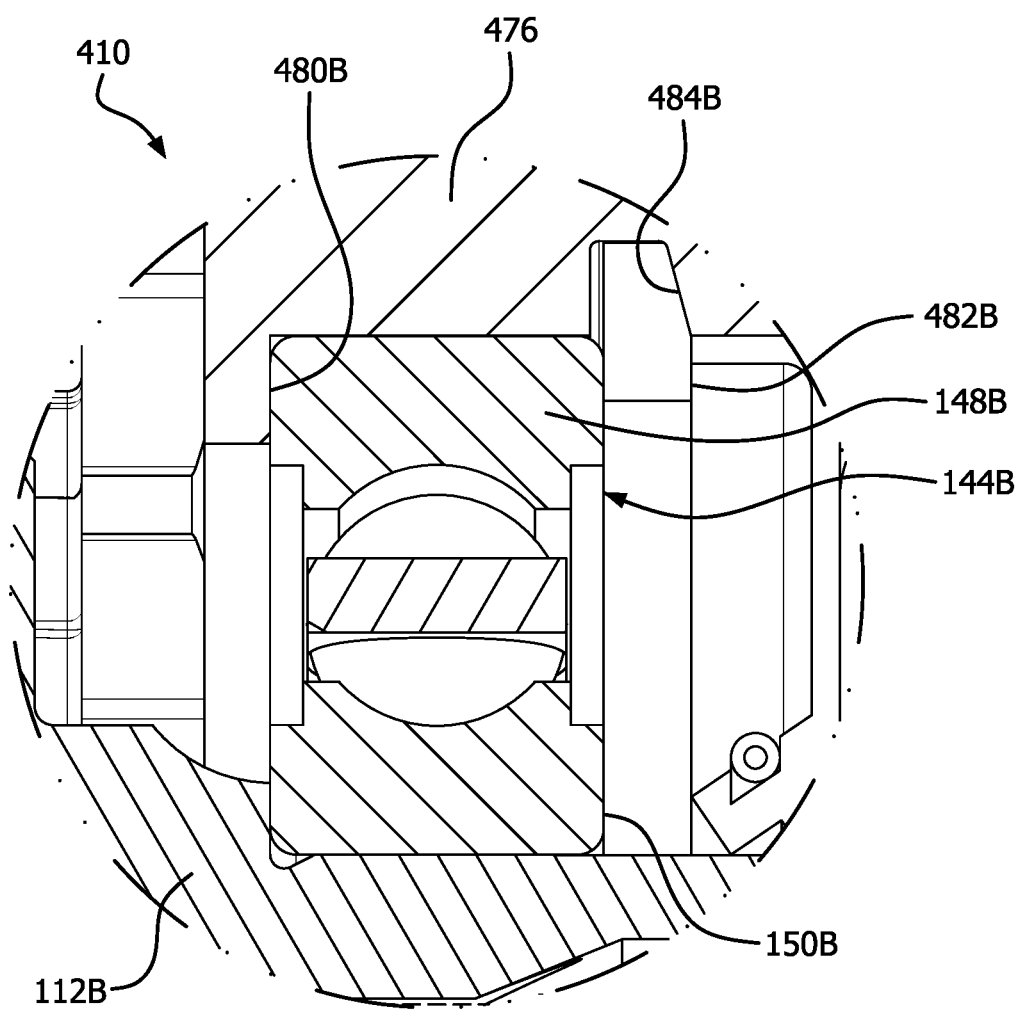
FIG. 9 is a detail side sectional view of the bi-directional overrunning clutch within the detail line identified as "FIG. 9" of FIG. 7.

The differential 410 also includes features for supporting the output hubs 112A, 112B to inhibit or prevent the torque limiting event from occurring. More specifically and referring to the detail view of FIG. 8, the cover 478 includes a roller bearing seat 480A, or a recess formed by an annular projection, within which the outer race 148A of the roller bearing 144A is seated, and the inner race 150A of the roller bearing 144A is positioned against and supports the hub 112A. The roller bearing seat 480A may continuously extend around the rotation axis of the hub 112A, or the roller bearing seat 480A may be interrupted. A retaining ring 482A, more specifically a snap ring, secures the roller bearing 144A within the seat 480A in the cover 478. The retaining ring 482A is positioned against the outer race 148A of the roller bearing 144A. Illustratively, the retaining ring 482A is tapered and received by a tapered ring groove 484A to positively lock the ring 482A against the bearing 144A and reduce or eliminate axial end play of the bearing 144A. Stated differently, the retaining ring 482A compresses the bearing 144A against the cover 478 to secure the bearing 144A in the seat 480A. Similarly and referring to the detail view of FIG. 9, the gear case 476 includes a roller bearing seat 480B, or a recess formed by an annular projection, within which the outer race 148B of the roller bearing 144B is seated, and the inner race 150B of the roller bearing 144B is positioned against and supports the hub 112B. The roller bearing seat 480B may continuously extend around the rotation axis of the hub 112A, or the roller bearing seat 480B may be interrupted. A retaining ring 482B, more specifically a snap ring, secures the roller bearing 144B within the seat 480B in the gear case 476. The retaining ring 482B is positioned against the outer race 148B of the roller bearing 144B. Illustratively, the retaining ring 482B is tapered and received by a tapered ring groove 484B to positively lock the ring 482B against the bearing 144B and reduce or eliminate axial end play of the bearing 144B. Stated differently, the retaining ring 482B compresses the bearing 144B against the gear case 476 to secure the bearing 144B in the seat 480B. Thus and referring collectively to FIGS. 7-9, the roller bearings 144A, 144B are secured to the cover 478 and the gear case 476, respectively, and the roller bearings 144A, 144B are inhibited from moving axially relative to the housing 474.

Additionally, a one-piece bushing 156 (FIG. 7) is located within and couples the output hubs 112A, 112B. In the illustrated embodiment, the seats 480A, 480B are disposed axially inward of the roller bearings 144A, 144B, respectively, and the retaining rings 482A, 482B are disposed axially outward of the roller bearings 144A, 144B, respectively. Thus, for installation, the roller bearings 144A, 144B are inserted from the outside of the cover 478 and the gear case 476, respectively, and then the retaining rings 482A, 482B are inserted from the outside of the cover 478 and the gear case 476, respectively.

Figure 10:
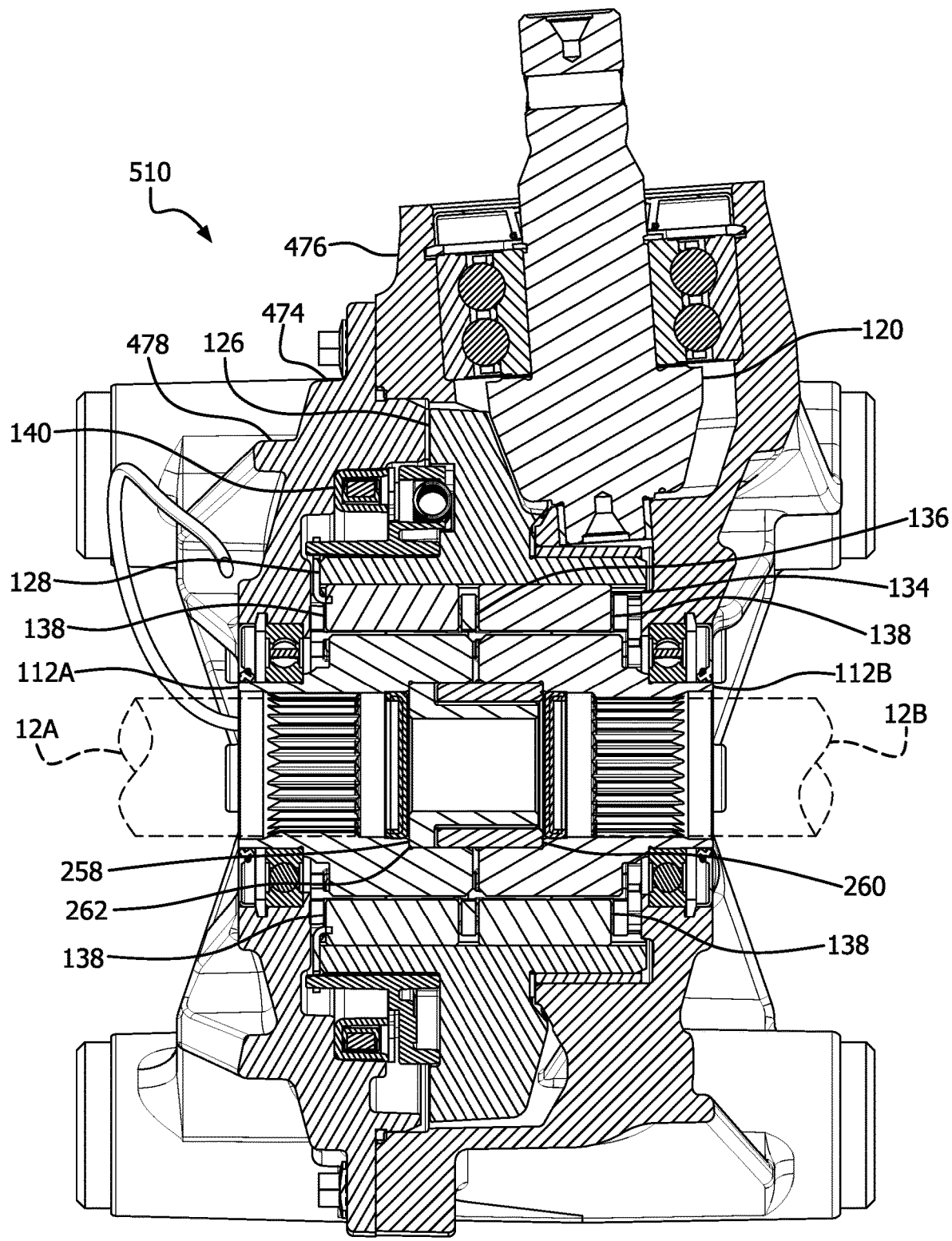
FIG. 10 is a side sectional view of a bi-directional overrunning clutch according to a fifth embodiment of the present invention.

FIG. 10 illustrates a bi-directional overrunning clutch differential 510 according to another embodiment of the present invention. The differential 510 includes many of the same components as the differentials 210 and 410 described above, and the same components are identified with the same reference numbers. The differential 510 generally includes a housing 474, specifically a gear case 476 and a cover 478, that rotatably carries a pinion input gear 120 and a ring gear 126. The ring gear 126 is formed integral with or attached to a clutch housing 128. A roll cage assembly 134 is located within the clutch housing 128 and includes a roll cage 136 with a plurality of rotatable rollers 138. Output hubs 112A, 112B include a portion located radially inward of the roll cage 136. Each hub 112A, 112B is adjacent to one of the sets of rollers 138 such that the outer surface of a portion of each hub contacts a set of rollers 138. The overrunning clutch is engaged or activated, for example, by energizing an electromagnet assembly 140, to cause contact between the rollers 138, the clutch housing 128, and the hubs 112A, 112B. The overrunning clutch thereby transfers rotation between the clutch housing 128, the hubs 112A, 112B, and output shafts 12A, 12B.

The differential 510 also includes features for supporting the output hubs 112A, 112B to inhibit or prevent the torque limiting event from occurring. More specifically and with reference to the detail view of the differential 410 in FIG. 8, which illustrates the same features as the differential 510, the cover 478 includes a roller bearing seat 480A, or a recess formed by an annular projection, within which the outer race 148A of the roller bearing 144A is seated, and the inner race 150A of the roller bearing 144A is positioned against and supports the hub 112A. A retaining ring 482A, more specifically a snap ring, secures the roller bearing 144A within the seat 480A in the cover 478. The retaining ring 482A is positioned against the outer race 148A of the roller bearing 144A. Illustratively, the retaining ring 482A is tapered and received by a tapered ring groove 484A to positively lock the ring 482A against the bearing 144A and reduce or eliminate axial end play of the bearing 144A. Stated differently, the retaining ring 482A compresses the bearing 144A against the cover 478 to secure the bearing 144A in the seat 480A. Similarly and with reference to the detail view of the differential 410 in FIG. 9, which illustrates the same features as the differential 510, the gear case 476 includes a roller bearing seat 480B, or a recess formed by an annular projection, within which the outer race 148B of the roller bearing 144B is seated, and the inner race 150B of the roller bearing 144B is positioned against and supports the hub 112B. A retaining ring 482B, more specifically a snap ring, secures the roller bearing 144B within the seat 480B in the gear case 476. The retaining ring 482B is positioned against the outer race 148B of the roller bearing 144B. Illustratively, the retaining ring 482B is tapered and received by a tapered ring groove 484B to positively lock the ring 482B against the bearing 144B and reduce or eliminate axial end play of the bearing 144B. Stated differently, the retaining ring 482B compresses the bearing 144B against the gear case 476 to secure the bearing 144B in the seat 480B. Thus and referring again to FIG. 10, the roller bearings 144A, 144B are secured to the cover 478 and the gear case 476, respectively, and the roller bearings 144A, 144B are inhibited from moving axially relative to the housing 474.

Additionally, a two-piece bushing 258 is located within and couples the output hubs 112A, 112B. The two-piece bushing 258 illustratively includes a cylindrical outer portion 260 and an open top hat-shaped inner portion 262.

In the illustrated embodiment, the seats 480A, 480B are disposed axially inward of the roller bearings 144A, 144B, respectively, and the retaining rings 482A, 482B are disposed axially outward of the roller bearings 144A, 144B, respectively. Thus, for installation, the roller bearings 144A, 144B are inserted from the outside of the cover 478 and the gear case 476, respectively, and then the retaining rings 482A, 482B are inserted from the outside of the cover 478 and the gear case 476, respectively.

Figure 11:
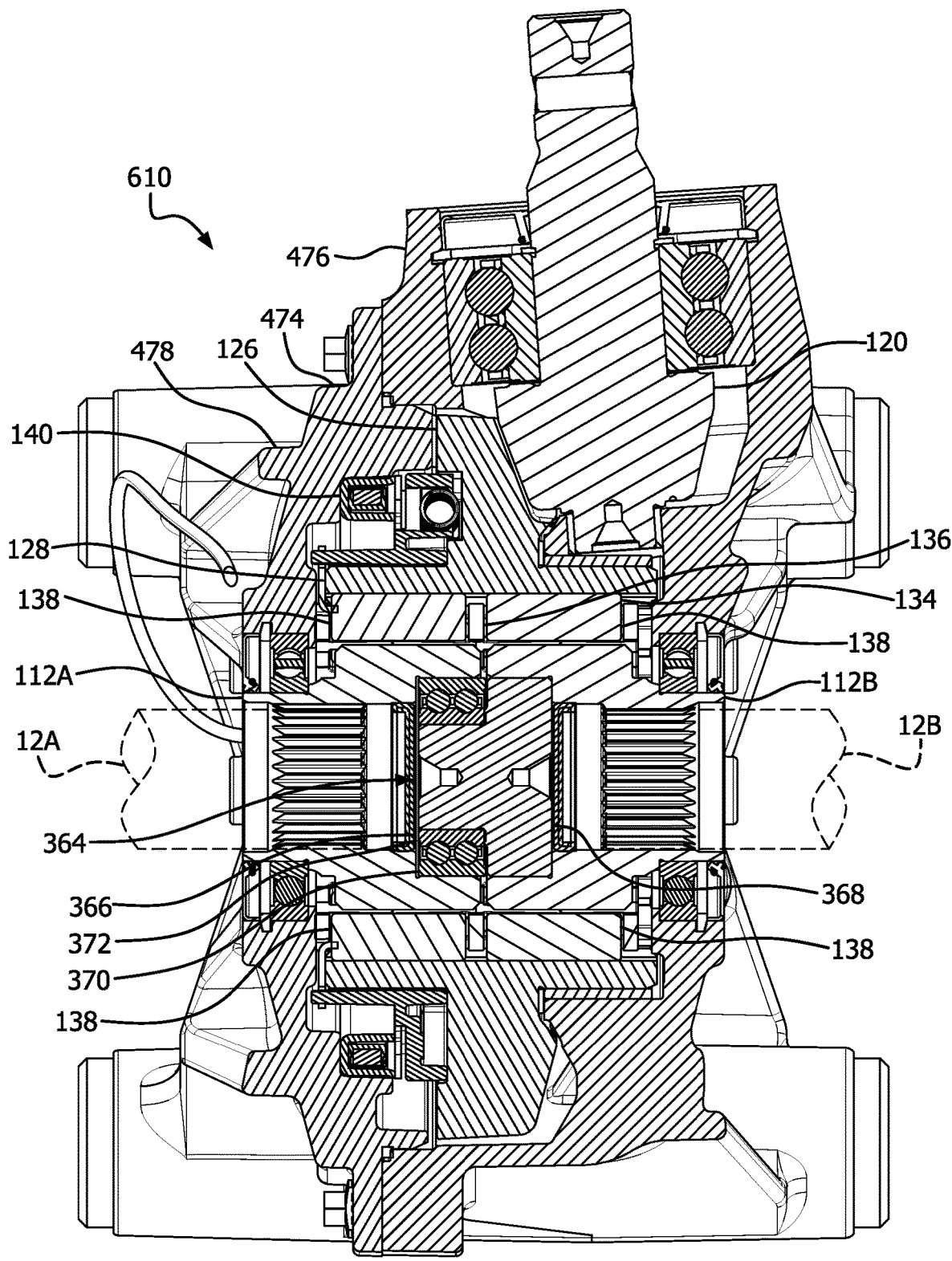
FIG. 11 is a side sectional view of a bi-directional overrunning clutch according to a sixth embodiment of the present invention.

FIG. 11 illustrates a bi-directional overrunning clutch differential 610 according to another embodiment of the present invention. The differential 610 includes many of the same components as the differentials 310 and 410 described above, and the same components are identified with the same reference numbers. The differential 610 generally includes a housing 474, specifically a gear case 476 and a cover 478, that rotatably carries a pinion input gear 120 and a ring gear 126. The ring gear 126 is formed integral with or attached to a clutch housing 128. A roll cage assembly 134 is located within the clutch housing 128 and includes a roll cage 136 with a plurality of rotatable rollers 138. Output hubs 112A, 112B include a portion located radially inward of the roll cage 136. Each hub 112A, 112B is adjacent to one of the sets of rollers 138 such that the outer surface of a portion of each hub contacts a set of rollers 138. The overrunning clutch is engaged or activated, for example, by energizing an electromagnet assembly 140, to cause contact between the rollers 138, the clutch housing 128, and the hubs 112A, 112B. The overrunning clutch thereby transfers rotation between the clutch housing 128, the hubs 112A, 112B, and output shafts 12A, 12B.

The differential 610 also includes features for supporting the output hubs 112A, 112B to inhibit or prevent the torque limiting event from occurring. More specifically and with reference to the detail view of the differential 410 in FIG. 8, which illustrates the same features as the differential 610, the cover 478 includes a roller bearing seat 480A, or a recess formed by an annular projection, within which the outer race 148A of the roller bearing 144A is seated, and the inner race 150A of the roller bearing 144A is positioned against and supports the hub 112A. A retaining ring 482A, more specifically a snap ring, secures the roller bearing 144A within the seat 480A in the cover 478. The retaining ring 482A is positioned against the outer race 148A of the roller bearing 144A. Illustratively, the retaining ring 482A is tapered and received by a tapered ring groove 484A to positively lock the ring 482A against the bearing 144A and reduce or eliminate axial end play of the bearing 144A. Stated differently, the retaining ring 482A compresses the bearing 144A against the cover 478 to secure the bearing 144A in the seat 480A. Similarly and with reference to the detail view of the differential 410 in FIG. 9, which illustrates the same features as the differential 610, the gear case 476 includes a roller bearing seat 480B, or a recess formed by an annular projection, within which the outer race 148B of the roller bearing 144B is seated, and the inner race 150B of the roller bearing 144B is positioned against and supports the hub 112B. A retaining ring 482B, more specifically a snap ring, secures the roller bearing 144B within the seat 480B in the gear case 476. The retaining ring 482B is positioned against the outer race 148B of the roller bearing 144B. Illustratively, the retaining ring 482B is tapered and received by a tapered ring groove 484B to positively lock the ring 482B against the bearing 144B and reduce or eliminate axial end play of the bearing 144B. Stated differently, the retaining ring 482B compresses the bearing 144B against the gear case 476 to secure the bearing 144B in the seat 480B. Thus and referring again to FIG. 11, the roller bearings 144A, 144B are secured to the cover 478 and the gear case 476, respectively, and the roller bearings 144A, 144B are inhibited from moving axially relative to the housing 474.

Additionally, a roller bearing assembly 364 is located within and couples the output hubs 112A, 112B. The roller bearing assembly 364 includes a roller bearing 366 and a top hat-shaped hub bearing adapter 368. An outer race 370 of the roller bearing 366 is positioned against the inner diameter of one of the hubs (illustratively, the output hub 112A), and the adapter 368 is positioned against the inner race 372 of the roller bearing 366 and the inner diameter of the other hub (illustratively, the output hub 112B). The adapter 368 may be a separate component, as illustrated, or monolithically constructed with one of the hubs 112A or 112B.

In the illustrated embodiment, the seats 480A, 480B are disposed axially inward of the roller bearings 144A, 144B, respectively, and the retaining rings 482A, 482B are disposed axially outward of the roller bearings 144A, 144B, respectively. Thus, for installation, the roller bearings 144A, 144B are inserted from the outside of the cover 478 and the gear case 476, respectively, and then the retaining rings 482A, 482B are inserted from the outside of the cover 478 and the gear case 476, respectively.

While the illustrated embodiments all shown the retaining ring having a taper that engages or slides against a corresponding tapered groove in the differential housing, it should be readily apparent that, alternatively, in any of the embodiments discussed above, a taper can be located on one or more of (i) a surface of the differential housing that the retaining ring contacts, (ii) a surface of the bearing that the retaining ring contacts, or (iii) a surface of the retaining ring that contacts the bearing and/or the differential housing. The tapered slope limits how far the retaining ring expands radially into the space between the bearing and the differential housing, while also imparting an axial force on the retaining ring and the adjacent bearing. This forces the bearing into its seat and removes bearing end play that is a result of manufacturing tolerances.

As used herein, the term "engage" is intended to both direct physical engagement through one or more components as well as operative engagement.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A differential for transmitting power from an input shaft to a first output shaft and a second output shaft in a vehicle, the differential comprising:
    a differential housing comprising a bearing seat;
    an input gear rotatably carried by the differential housing and configured to be rotatably driven by the input shaft;
    a ring gear rotatably carried by the differential housing and configured to be rotatably driven by the input gear;
    a first bearing carried by the differential housing in the bearing seat;
    a second bearing carried by the differential housing;
    a retaining ring carried by the differential housing, the retaining ring compressing the first bearing against the differential housing and securing the first bearing in the bearing seat;
    a bi-directional overrunning clutch comprising:
        a clutch housing formed on or coupled to the ring gear and being rotatable in combination with the ring gear, the clutch housing comprising an inner surface;
        a roll cage assembly disposed inwardly of the inner surface of the clutch housing, the roll cage assembly comprising a roll cage and a plurality of rollers carried by the roll cage;
    two output hubs, comprising:
        a first output hub disposed within the clutch housing and carried by the first bearing for rotation relative to the differential housing, the first output hub configured to rotatably drive the first output shaft;
        a second output hub disposed within the clutch housing and carried by the second bearing for rotation relative to the differential housing, the second output hub configured to rotatably drive the second output shaft;
    wherein the bi-directional overrunning clutch is engageable to cause the plurality of rollers to wedge between the inner surface of the clutch housing and the output hubs, the output hubs and the clutch housing thereby being rotatable in combination; and
    an electromagnet assembly configured to be energized to cause engagement of the bi-directional overrunning clutch.

2. The differential of claim 1, wherein the retaining ring is located between a surface of the differential housing and a surface of the bearing, and wherein at least one of (i) the surface of the differential housing, (ii) the surface of the bearing, or (iii) a surface of the retaining ring includes a taper.

3. The differential of claim 2, wherein surface of the differential housing is a tapered groove, and the retaining ring is a tapered retaining ring carried in the tapered groove.

4. The differential of claim 1, wherein the retaining ring is a snap ring.

5. The differential of claim 1, wherein the bearing seat is a first bearing seat and the retaining ring is a first retaining ring, the differential housing further comprises a second bearing seat, and the differential further comprises a second retaining ring carried by the differential housing, the second retaining ring compressing the second bearing against the differential housing and securing the second bearing in the second bearing seat.

6. The differential of claim 1, wherein the retaining ring is disposed axially inward of the first bearing and the bearing seat is disposed axially outward of the first bearing.

7. The differential of claim 1, wherein the retaining ring is disposed axially outward of the first bearing and the bearing seat is disposed axially inward of the first bearing.

8. The differential of claim 1, wherein the first bearing is a roller bearing.

9. The differential of claim 8, wherein the roller bearing includes an outer race and an inner race, the outer race is disposed between the retaining ring and the bearing seat, and the inner race carries the first output hub.

10. The differential of claim 1, further comprising a bushing disposed within and coupling the first output hub and the second output hub.

11. The differential of claim 10, wherein the bushing is a one-piece bushing.

12. The differential of claim 10, wherein the bushing is a two-piece bushing.

13. The differential of claim 1, further comprising a roller bearing assembly coupling the first output hub and the second output hub, the roller bearing assembly comprising:
- a roller bearing comprising an outer race and an inner race, the outer race positioned against an inner diameter of the first output hub; and
- a hub bearing adapter formed on or coupled to the second output hub and positioned against the inner race of the roller bearing.

14. A differential for transmitting power from an input shaft to a first output shaft and a second output shaft in a vehicle, the differential comprising:
- a differential housing comprising a first bearing seat and a second bearing seat;
- an input gear rotatably carried by the differential housing and configured to be rotatably driven by the input shaft;
- a ring gear rotatably carried by the differential housing and configured to be rotatably driven by the input gear;
- a first bearing carried by the differential housing in the first bearing seat;
- a second bearing carried by the differential housing in the second bearing seat;
- a first retaining ring carried by the differential housing, the first retaining ring compressing the first bearing against the differential housing and securing the first bearing in the first bearing seat;
- a second retaining ring carried by the differential housing, the second retaining ring compressing the second bearing against the differential housing and securing the second bearing in the second bearing seat;
- two output hubs configured to be selectively rotatably driven by the ring gear, the two output hubs comprising:
  - a first output hub carried by the first bearing for rotation relative to the differential housing, the first output hub configured to rotatably drive the first output shaft; and
  - a second output hub carried by the second bearing for rotation relative to the differential housing, the second output hub configured to rotatably drive the second output shaft.

15. The differential of claim 14, wherein the first retaining ring is located between a surface of the differential housing and a surface of the first bearing, and wherein at least one of (i) the surface of the differential housing, (ii) the surface of the first bearing, or (iii) a surface of the first retaining ring includes a taper.

16. The differential of claim 14, wherein the differential housing further comprises a first tapered groove and a second tapered groove, the first retaining ring is a first tapered retaining ring carried in the first tapered groove, and the second retaining ring is a second tapered retaining ring carried in the second tapered groove.

17. The differential of claim 14, wherein the first retaining ring is a first snap ring and the second retaining ring is a second snap ring.

18. The differential of claim 14, wherein the first retaining ring is disposed axially inward of the first bearing and the first bearing seat is disposed axially outward of the first bearing, and the second retaining ring is disposed axially inward of the second bearing and the second bearing seat is disposed axially outward of the second bearing.

19. The differential of claim 14, wherein the first retaining ring is disposed axially outward of the first bearing and the first bearing seat is disposed axially inward of the first bearing, and the second retaining ring is disposed axially outward of the second bearing and the second bearing seat is disposed axially inward of the second bearing.

20. The differential of claim 14, wherein the first bearing is a first roller bearing and the second bearing is a second roller bearing.

* * * * *

UNITED STATES PATENT AND TRADEMARK OFFICE
CERTIFICATE OF CORRECTION

PATENT NO. : 11,421,769 B2
APPLICATION NO. : 17/324689
DATED : August 23, 2022
INVENTOR(S) : Kelly P. Heath, Howard J. Knickerbocker and Kevin Bennett It is certified that error appears in the above-identified patent and that said Letters Patent is hereby corrected as shown below:

In the Specification

In Column 5, Line 30:
Please change "roller 104" to "roller 138".

Signed and Sealed this
Eighth Day of November, 2022

Katherine Kelly Vidal
*Director of the United States Patent and Trademark Office*